United States Patent [19]
Allen

[11] Patent Number: 6,160,880
[45] Date of Patent: Dec. 12, 2000

[54] LOCAL NUMBER PORTABILITY SERVICE SAVER

[75] Inventor: Robert R. Allen, Derwood, Md.

[73] Assignee: Bell Atlantic Network Services, Inc., Arlington, Va.

[21] Appl. No.: 09/053,678

[22] Filed: Apr. 2, 1998

[51] Int. Cl.[7] .................................................. H04M 3/42
[52] U.S. Cl. ...................... 379/207; 379/219; 379/333; 379/336
[58] Field of Search ..................... 379/207, 219, 379/220, 221, 229, 230, 242, 317, 333, 334, 335, 336, 337

[56] References Cited

U.S. PATENT DOCUMENTS

| | | | |
|---|---|---|---|
| 4,791,665 | 12/1988 | Bogart et al. ............................ | 379/207 |
| 5,247,571 | 9/1993 | Kay et al. ................................ | 379/212 |
| 5,341,415 | 8/1994 | Baran ...................................... | 379/201 |
| 5,392,277 | 2/1995 | Bernstein ................................ | 379/334 |
| 5,408,525 | 4/1995 | Eldering ................................. | 379/162 |
| 5,553,129 | 9/1996 | Partridge, III ......................... | 379/220 |
| 5,566,235 | 10/1996 | Hetz ....................................... | 379/201 |
| 5,598,464 | 1/1997 | Hess et al. .............................. | 379/213 |
| 5,625,681 | 4/1997 | Butler, II ................................ | 379/207 |
| 5,661,792 | 8/1997 | Akinpelu et al. ....................... | 379/221 |
| 5,675,643 | 10/1997 | Byers ...................................... | 379/399 |
| 5,796,813 | 8/1998 | Sonnenberg ............................ | 379/220 |
| 5,867,570 | 2/1999 | Bargout et al. ......................... | 379/207 |
| 5,883,948 | 3/1999 | Dunn ...................................... | 379/210 |
| 6,038,303 | 3/2000 | Sanford et al. ......................... | 379/201 |

*Primary Examiner*—Krista Zele
*Assistant Examiner*—Benny Q. Tieu
*Attorney, Agent, or Firm*—McDermott, Will & Emery

[57] ABSTRACT

Local telephone number portability is effected with automatic changeover of local telephone service for a subscriber station from an incumbent local exchange carrier (ILEC) loop to a competing local exchange carrier (CLEC) loop. A relay device that may be placed remotely at the subscriber's location automatically effects a change in physical connection of the subscriber's line in response to an incoming call routed to the customer premises via the CLEC switching facility. The physical presence of a technician thus is not required at the customer premises at the time changeover of service is made. Delay in the capability of receiving incoming calls at the customer premises during changeover of service is avoided by ensuring that physical reconnection is made only after the appropriate updated routing information has been made to the PSTN network. If a call via the old subscriber service is in progress, automatic reconnection is inhibited until an off-hook condition is realized.

16 Claims, 2 Drawing Sheets

LOCAL NUMBER PORTABILITY SERVICE SAVER

TECHNICAL FIELD

The present invention relates to telecommunications, more particularly to local number portability provisioning for telephone service users who change service providers.

BACKGROUND ART

Recent legislative and regulatory changes have been made to spur a more open service provider environment in the telecommunications industry. One aspect of this policy is embodied in a requirement that an incumbent local exchange carrier (ILEC) unbundle certain network elements and services and offer use of those elements and services to other carriers for resale to end users. The ILEC, for example, must make available for sale to another carrier an unbundled port on an end office switch. The other carrier can then become a competing local exchange carrier (CLEC) by reselling services of the switch to end users having local loops that connect to the end office switch. Those statutory and regulatory changes also require that customized routing be available for both unbundled switching and for resale. Customized routing is the term used in the regulations for routing calls made in the ILEC switch to locations other than normal routing locations.

Another aspect of this policy pertains to CLECs that are facility based, e.g., those competing carriers that have their own independent switching facilities. These facilities must be integrated into the public switched telephone network (PSTN) in a seamless manner from the user's perspective. The concept of user telephone number portability is basic to this end. In general, number portability refers to the ability of end users to retain their geographic or non-geographic telephone number when they change their service provider, their location, or their service. A wide application of number portability, for example, would permit a user to keep the same telephone number at the same or different location, while terminating service from one provider in favor of a new service provider, and moving from plain old telephone service (POTS) to integrated digital services network (ISDN).

The Federal Communications Commission has proposed standards for local number portability (LNP) that relates to the ability of a telephone service subscriber to select or change the selection of a carrier for providing that customer's local telephone service, while still maintaining the subscriber's telephone number at the same customer premises. The physical aspects of maintaining the same telephone number for a customer while changing service from an ILEC to a CLEC using an unbundled port on the same switch are relatively straightforward. Provision of local number portability for a change of local service from an ILEC to a provider having its own switching facility with its own subscriber loop or unbundled loop between its switch and the customer's premises, is more problematical. The network must be capable of routing calls dialed to the same subscriber's number through the changed facilities. While an actual change of connections from the old ILEC plant to the new CLEC plant at the premises by a technician will permit customer off-hook to draw dial tone for calling out via the CLEC line, the ability to receive incoming calls is not so easily effected. Incoming call routing is dependent upon the association of the new customer line with the appropriate routing information in the PSTN network.

Until the subscriber's telephone number is identified in the system with the new CLEC destination line or the CLEC switch to which it is coupled, the subscriber cannot receive incoming calls to that line. If physical reconnection has been established, no incoming calls will be received via the old ILEC subscriber line. Service disruption, besides being annoying and unacceptable to the subscriber, is a serious disadvantage in that the ability to provide adequate 911 emergency service is compromised. The 911 service center, which has access to the originating numbers of callers, will not be able to terminate calls to users who are in the process of changing service providers. To avoid unacceptable delay in service, the physical line reconnection must be closely coordinated with a change in system database information. Such a requirement places a burden on technician resources and incurs increased expense in providing appropriate use of such resources.

Several arrangements have been proposed for allowing a customer access to one of several carriers to which the customer may concurrently subscribe. For example, U.S. Pat. No. 5,341,415, issued to Baran, is directed to a method and apparatus for sharing common in-house wiring to permit multiple telephone carriers to serve the same customer. The primary, or default, carrier is envisioned as the local telephone company, while a secondary carrier may comprise a cable TV system or the like. The user selectively may dial out through either carrier. The subscriber line is normally connected to the primary carrier, normally disconnected from the secondary carrier. A predesignated DTMF code may be entered, prior to dialing out, to select the secondary carrier, whereby the reverse connections and disconnections are effected. Incoming calls via the secondary carrier can be completed only if no call via the primary carrier is in progress, with appropriate connections made. Routing of incoming calls is made pursuant the dialed number for the user that corresponds to the respective carrier. U.S. Pat. No. 5,408,525, issued to Eldering, is directed to a 'diverter' at the user site for selectively interfacing a customer's standard telephone set on an in-house line with a first external telephone line and a second external telephone line from competing carriers. If the user wants to use the secondary line, the user first dials an access code. A set monitor in the diverter detects the code and triggers a switch to connect the in-home line to the secondary line. Ring detectors are included in the diverter for switching the in-home line to either line in response to an incoming call. Neither patent provides for local number portability wherein the subscriber retains the same telephone number for a new carrier service provider that was used for the earlier, terminated, carrier service provider. The public switched telephone network will route calls through to the carrier associated with the dialed number. There is no change in routing for that number. Both patents are directed to customer controlled, rather than provider controlled, cutover mechanisms.

DISCLOSURE OF THE INVENTION

The present invention meets the challenge of local number portability, while avoiding the drawbacks and disadvantages described above, in part by providing a device that may be placed remotely at the subscriber's location or point of interconnection. Such a device will automatically make a change in physical connection of the subscriber's line from the ILEC loop to the new CLEC loop in response to an incoming call routed to the customer premises via the CLEC switching facility.

An advantage of the present invention is that the physical presence of a technician is not required at the customer premises at the time changeover of service is made from one carrier to another.

A further advantage of the present invention is that a delay in the capability of receiving incoming calls at the customer premises during changeover of service is avoided by ensuring that physical reconnection is made only after the appropriate updated routing information has been made to the PSTN network. As a consequence of the invention, outgoing and incoming call capability is changed together from the incumbent carrier to the new carrier without a noticeable service interruption period.

An additional advantage of the present invention is that, if a call via the old subscriber service is in progress, automatic reconnection is inhibited until an off-hook condition is realized. Interruption of use is thereby avoided.

BRIEF DESCRIPTION OF DRAWINGS

Reference is made to the attached drawings, wherein elements having the same reference numeral designations represent like elements throughout and wherein.

DESCRIPTION OF THE PREFERRED EMBODIMENTS

Figure 1:
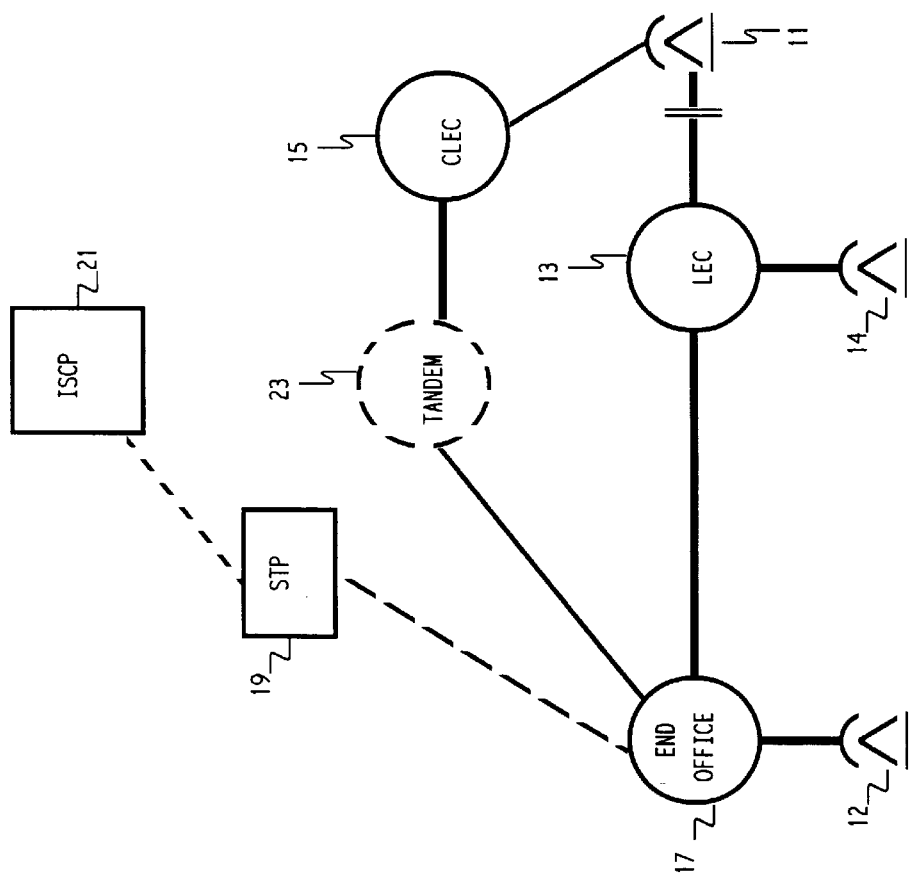
FIG. 1 is a simplified diagram of a public switched telephone network that embodies switching facilities of a local exchange carrier and a competing local exchange carrier in an advanced intelligent network (AIN) in accordance with the present invention.

FIG. 1 is a simplified diagram of a public switched telephone network that embodies switching facilities of an incumbent local exchange carrier (ILEC) and a competing local exchange carrier (CLEC) in an advanced intelligent network (AIN). In an AIN system, central offices having service switching points (SSPs) exchange data messages with an integrated services control point (ISCP) via one or more switching transfer points (STPs). At least some calls are thus controlled through multiple central office switches using data retrieved from a database in the ISCP. The SSPs, STPs and ISCPs are elements of a common channeling signaling network that uses SS7 protocol in out of band signaling paths separate from the paths used for voice transmission. It will be recognized, of course, that FIG. 1 is considerably simplified for explanation purposes and that the full network and operating environment for the invention may comprise multiple central offices, diverse interconnections, and provisions for reliability through redundancy, not all of which need be shown for developing an understanding of the invention. For a more detailed description of an AIN system, suitable for implementation in connection with the present invention, reference is made to U.S. Pat. No. 5,247,571 to Kay and McConnell, the disclosure of which is incorporated herein by reference. The Kay and McConnell patent is assigned to the assignee of the present invention.

In accordance with the invention, a customer may obtain local exchange telephone service from either an incumbent local exchange carrier (ILEC) or a competing local exchange carrier (CLEC). In the illustrated example, the subscriber at station 11, who originally received service through the ILEC end office 13, has now selected the competing carrier in replacement thereof for local service. Accordingly, the station 11 is shown connected to the CLEC end office 15, the previous subscriber loop connection to ILEC switching office 13 having been disabled. The CLEC end office 15 may connect through trunk circuits to each ILEC end office in the area of service or to a trunk connection with an access tandem 23. Although not shown, the CLEC end office 15 also connects into the common channel interoffice signaling network, at least for the exchange of call-setup related signaling messages.

The ILEC end office 13 has an assigned area code (NPA) and exchange code (NXX) in accord with the North American Number Plan (NANP). From the range of numbers available with that NPA-NXX code, the subscriber at station 11, served originally by the ILEC, had an assigned ten-digit telephone number (NPA-NXX-XXXX). As an illustrative example, it is assumed that the ILEC end office 13 has the area code and exchange code of 703-236, and that the customer at station 11 had a telephone number of 703-236-5432. The CLEC end office 15 similarly is assigned a range of available numbers with a different NPA-NXX. In the illustrated example, it is assumed that the CLEC end office 15 has an NPA-NXX of 703-434. A new customer of the CLEC who does not retain a previously assigned number will receive a new telephone number including the NPA-NXX: 703-434. Such customer, for example, may have changed premises.

The customer at station 11 who has decided to change local service at the existing premises from the ILEC to the CLEC, as depicted by FIG. 1, has an option either to be assigned a new number from the number range accorded to the CLEC or to take, or 'port', the pre-existing number over to the CLEC. Implementation of local number portability requires a change both in the physical reconnection in the subscriber loop and in the call routing data stored in the system. The subscriber loop must be able to draw dial tone and deliver ringing signals to the station 11 via the CLEC portion of the network, as well as to provide a voice transmission path. Incoming calls, for example, dialed from station 12 via end office 17 to the old NPA-NXX-XXXX number, 703-236-5432, now must be routed to the station 11 through a CLEC switch having a different NPA-NXX, 703-434, notwithstanding that the 703-236 code is not assigned to the office 15. To achieve this end, stored routing data must be changed at the time the physical subscriber loop change occurs. In order to route ported number calls, each originating switching office will access an appropriate database during call processing to obtain the pertinent new routing data.

For a call placed by station 12 to station 11, the originating end office 17 will query a routing database through STP 19 and ISCP 21. In response to the query, the database returns a Location Routing Number (LRN) for use in routing the call to the correct CLEC end office 15. For number portability, one number in the range of numbers assigned to the CLEC end office 15 is designated as a local routing number. In the illustrated example, the LRN for end office 15 is assumed to be 703-434-8888. When the caller at station 12 dials 703-236-5432, a trigger that has been set against the NPA-NXX codes (236 and/or 703-236) in the originating end office 17 is initiated. (In some locations the caller need not dial the NPA prefix as the switch will supply the code.) Detection of the dialing of the 236 code therefore triggers AIN processing by the end office 17. The end office 17 suspends call processing and launches a Transaction Capabilities Applications Protocol (TCAP) query through the common channel signaling network. The TCAP query goes through STP 19 to the ISCP 21. The TCAP query includes a variety of data fields that contain information about the call. One such field is the called party number (CPN) field. In the initial query to the ISCP 21, the CPN field contains the dialed number (236-5432 or 703-236-5432).

The ISCP 21 database includes a table that has an entry for each ported number but no entries for non-ported numbers. Each entry may contain the LRN of the CLEC switch that corresponds to the ported number. Alternatively, to facilitate operation, ported numbers and their corresponding LRNs may all be stored in one or more external databases from which the ISCP can retrieve information. In response to the TCAP query from originating end office 17, the ISCP extracts the CPN and, either from its own table or an external database, obtains a translation of 703-236-5432 into 703-434-8888. The ISCP then formulates a TCAP response message based on the number translation, with the LRN (703-434-8888) placed in the CPN field of the response. The ISCP 21 transmits the response message back through the STP 19 to the originating end office 17. Upon receipt of the response message, the end office 17 resumes its processing of the call. Based on the information contained in the response message, the call is routed in an otherwise normal manner to the CLEC office 15, using its LRN as the called number. This office then completes the connection of the call to station 11.

Routing of the call to the CLEC end office 15 includes transmission of a number of SS7 protocol interoffice signaling messages by the originating end office 17. The first of these messages is an Initial Address Message (IAM) transmitted from the originating end office to the terminating end office 15. For a ported number call, the IAM message will contain the LRN in the CPN field. The IAM message also includes a generic address parameter (GAP) field. The originating end office 17 places the actual destination number (703-236-5432) in the GAP field of the IAM, for each call to a ported number as indicated by the presence of an LRN in the response from the ISCP 21. The originating end office 17 also sets the appropriate bit in the forward call indicator parameter of the IAM to '1', to indicate to any subsequent switch in the call path that the number portability query has already been completed for this call. The CLEC end office 15 will recognize the IAM message with the LRN in the CPN field as a message relating to a call to a ported number. Therefore, the CLEC end office 15 will utilize the number in the GAP field as the actual destination number. After the IAM message, the CLEC end office 15 will process the call in the normal manner to determine availability or busy status and ring and complete the call to the station 11 if available.

Each of the local carrier end offices has an identified LRN designated from its assigned range of numbers. Each originating switching office also contains NPA-NXX codes for all other offices that no longer serve ported number subscribers. In this example the caller at station 12 has dialed a ported number. If, instead, the caller had dialed a non-ported number that is still being served by the ILEC office 13, the ISCP query would still take place because the dialed NXX is associated with ILEC 13 from which at least one number has been ported out. For example, if a caller at station 12 dials 236-1111, a number of station 14 that is still served through the ILEC switching office 13, the originating end office 17, triggered by the 236 NXX, would formulate the query and send the query to the ISCP 21. However, in this case the ISCP will not have a listing because the called party number (703-236-1111) has not been ported over to a CLEC. The ISCP therefore would send a response back that includes the dialed number (703-236-1111) in the CPN field. The completion of the call to the non-ported telephone number will have been delayed by the time necessary to query the ISCP 21 and obtain a response.

If the caller calls from a number that normally resides within the exchange that serves the calling party, the internal switch translations will determine how the call is routed. For example, if a caller at a station served by ILEC 13 dials a call to station 14 (236-1111), the ILEC end office 13 utilizes its internal translations. If the switch still provides telephone service for that number, the end office 13 completes the call in the normal manner. If the call is to a ported number, such as 236-5432, then the switch will initiate a query via the ISCP to obtain the LRN (e.g. 434-8888). The end office 13 then routes the call through the CLEC end office 15 using the LRN as the CPN and using the destination number as the GAP.

Figure 2:
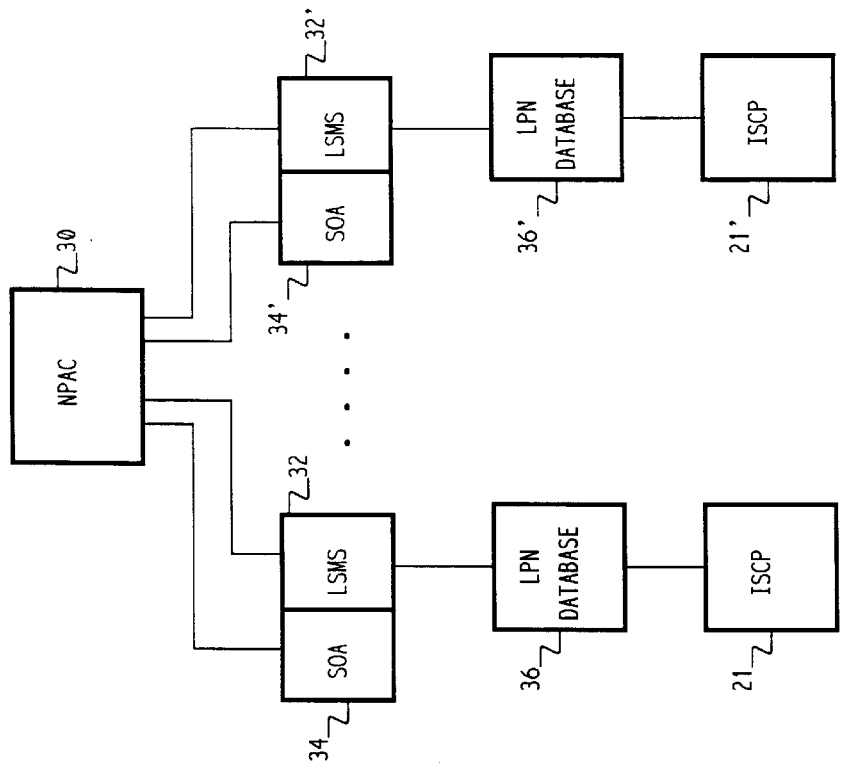
FIG. 2 is a block diagram illustrative of the administration of local number portability among local carriers in accordance with the present invention.

FIG. 2 is a block diagram illustrative of the administration of local number portability among local carriers. In order to coordinate changes of local service among competing carriers while accommodating local number portability, regulations have established a Number Portability Administration Center (NPAC) 30 for each geographical region under the control of a neutral third party. Each local carrier has its own Local Service Management System (LSMS) 32, 32' that interacts with the NPAC. The LSMS for each carrier is in communication with a respective LPN database 36, 36'. While shown as a single block, each LPN database may comprise a plurality of databases. LPN 36 stores tables having translations of LPNs to LRNs for completion of calls from its LNP subscribers. These tables are populated in accordance with ported number data received from the NPAC via the LSMS. LPN 36 also contains a database of ported numbers that are correlated with LRNs of other carriers to enable routing of outgoing calls to ported numbers in the manner described with respect to FIG. 1. Each LPN 36, 36' database is accessible by the ISCP 21, 21' or equivalent thereof for the respective carrier to enable the routing of ported number calls. Thus, in order for service to be established for a number ported from another local carrier, all LPN databases must be updated.

In conjunction with the LSMS, a Service Order Administration (SOA) module 34, 34' for each carrier also is linked with the NPAC. Upon receipt of an order for a new LNP subscriber, the CLEC SOA will notify the NPAC, identifying the LPN number and the CLEC's LRN number, thereby placing the order in a pending status. Updating the PSTN routing information databases and the LNP databases of the other carriers by the NPAC should occur after the physical subscriber loop changeover, as until that time the subscriber still will be operatively connected to the original carrier. A CLEC having its own switching facility will provide a new subscriber loop to the new LNP customer premises. When the change of service takes place, the customer premises line must be disconnected from the original loop and reconnected to the new CLEC subscriber loop. After completion of the physical subscriber loop wiring at the new serving office switch, the CLEC SOA will send a message to the NPAC to change the pending order to an activated status. The NPAC then performs the appropriate database updating. Calls placed to the ported number thereafter will be routed to the CLEC instead of the old ILEC. At this point in the setup process, the actual physical activation of the new CLEC subscriber loop and the deactivation of the original subscriber loop at the customer premises end, or at another location remote from the switching office, should be implemented as soon as possible to avoid an unacceptable discontinuity of service. Dispatch of a technician to manually perform this change would require careful scheduling coordination.

Figure 3:
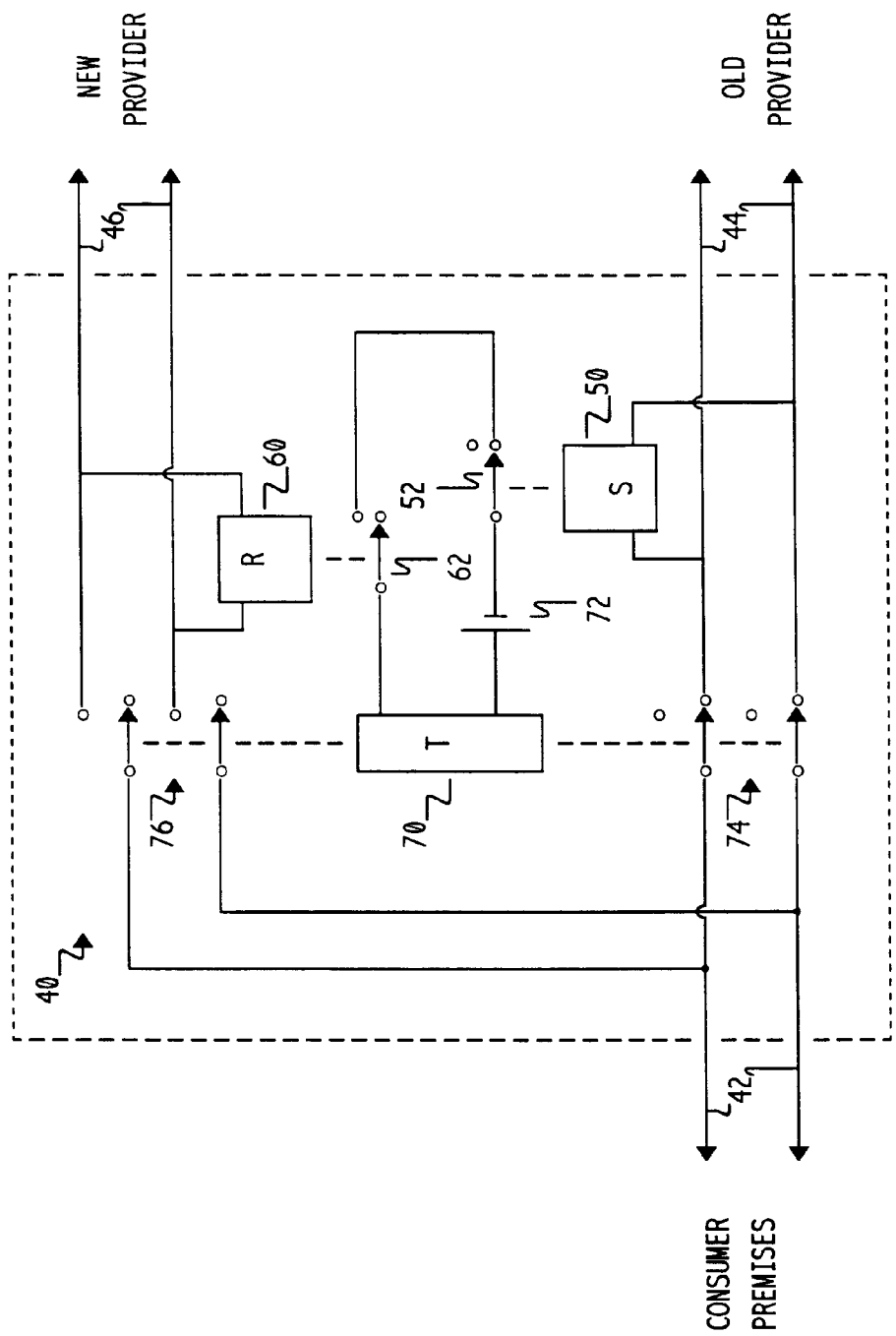
FIG. 3 is a diagram of an automatic subscriber loop reconnection arrangement in accordance with the present invention.

FIG. 3 is a diagram of an automatic subscriber loop reconnection arrangement in accordance with the present invention. The reconnection device 40 includes wiring pair 42, connectable to the customer premises plant, wiring pair 44, connectable to the old service provider, and wiring pair 46, connectable to the new CLEC provider. Installation of these connections may be made at any convenient time prior to change of service such as, for example, when the new CLEC subscriber loop is provided. Although the reconnection device 40 preferably is removable, to be reused at other installations, the device may remain connected for the duration of the new service. In the preferable alternative, the device may simply be bypassed by permanent connections and then removed at any time after change of service. Any need for close scheduling of a technician for this purpose thus is eliminated.

Reconnection device 40 includes three relays. Relay S 50 is connected across the old subscriber loop to be responsive to voltage on these lines. Relay R 60 is connected across the new subscriber loop to be responsive to CLEC ringing voltage. Relay R preferably is of a well known lockup relay type whereby its normally open contacts 62 will remain in its activated position even after relay energization ceases. Relay T 70 is connected in series circuit with voltage source 72, normally closed switch contacts 52, and normally open contacts 62. Voltage source 72 may comprise a battery or other suitable means for energizing relay T. Actuation of switch 52 is under the control of relay S which, when energized, will open switch contacts 52. Actuation of switch 62 is under the control of relay R which, when energized will close switch contacts 62. Normally closed switch contacts 74, operatively controlled by relay T, are connected in series with each line of the old subscriber loop pair. Normally open switch contacts 76, operatively controlled by relay T, are connectable in series with each line of the new CLEC subscriber loop pair. When relay T is energized, early break switch contacts 74 will open before closure of switch contacts 76. Relay T also may comprise any commercially available relay that will lock its switch contact positions after actuation.

In operation, after the service order change has been activated to update the various databases with the new routing data, a call is placed to the ported number customer. Ring signal voltage is applied to the CLEC lines in conventional manner. In response to detection of the ring signal voltage, relay R is actuated to close switch contacts 62. If switch contacts 52 are closed at this time, relay T will be energized from voltage supply 72. Energization of relay T in turn will actuate switch contacts 74 to their open positions and then switch contacts 76 to their closed positions. Once actuated, these switches remain in these positions after relay T is no longer energized. Dial tone can now be received for outgoing calls and routing for incoming calls will be established through the new CLEC facility. Reconnection of the consumer premises lines from the old provider to the new provider thus can be effected virtually immediately after the NPAC makes the appropriate database routing information changes and a call is made to the ported number.

Prior to reconnection, it is possible that the customer station may be in use while still connected to the old provider loop. Relay S is responsive to off-hook voltage on these lines to activate switch contact 52 to its open position. An incoming call placed through the new service provider at this time will not effect reconnection as the energizing circuit for relay T will be open, rendering it inoperative. The device thus assures that current telephone use is not interrupted. Failure to receive an off-hook response to its call is an indication to the CLEC that either no one is available at the subscriber premises to answer the call or that a previous call through the old provider lines is in progress. In either case, the ringing voltage supplied over the new provider lines will energize lockup relay R to actuate contacts 62 to a permanently closed position. Relay T will be energized to effect changeover when relay S is not energized by a voltage from the old provider line, e.g., when a call in progress is completed.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, the device may be deployed at locations removed from the vicinity of the customer premises. Further, while conventional electromechanical relays have been illustrated, equivalent electronic units may be substituted therefor without departing from the concepts of this invention.

What is claimed is:

1. In a public switched telephone network (PSTN) including a plurality of switching facilities, each switching facility respectively associated with one of a plurality of local providers serving telephone stations connected to respective subscriber lines, said telephone stations having local telephone numbers assigned thereto, said switching facilities having associated therewith respective routing identification information stored in said PSTN, an apparatus for providing local telephone number portability to one of said remote telephone stations upon change of service thereto from a first one of said switching facilities to a second one of said switching facilities, said apparatus located in proximity to said one remote telephone station and comprising:

a first communication line pair coupled to said first switching facility;

a second communication line pair coupled to said second switching facility;

a relay controller having a first switch connection to said first communication line pair, a second switch connection to said second communication line pair, and a third communication line pair coupled to the subscriber line of said one remote telephone station, a communication path in said relay controller existing between said third communication line pair and said first communication line pair via said first switch connection prior to said change of service and a communication path in said relay controller permanently established between said third communication line pair and said second communication line pair via said second switch connection in response to an incoming call to said subscriber line received from said second switching facility upon said change of service.

2. An apparatus as recited in claim 1, wherein said first switch connection comprises a set of normally closed switch contacts and said second switch connection comprises a set of normally open switch contacts, and further comprising:

a control relay operatively engaging said normally open and normally closed switch contacts.

3. An apparatus as recited in claim 2, wherein said control relay is connected to a voltage supply via a series circuit path comprising a second set of normally closed switch contacts and a second set of normally open switch contacts.

4. An apparatus as recited in claim 3, further comprising a voltage responsive relay connected across said first communication line pair and operatively engaging said second set of normally closed switch contacts.

5. An apparatus as recited in claim 3, further comprising another voltage responsive relay connected across said second communication line pair and operatively engaging said second set of normally open switch contacts.

6. An apparatus as recited in claim 2, wherein said control relay is a locking relay and said normally open and normally closed contacts retain changed positions after activation by said control relay.

7. An apparatus as recited in claim 1, wherein said first and second switching facilities are each associated with a different one of said local providers and said routing identification information comprises a location routing number for calls directed to local telephone number portability subscriber stations.

8. In a public switched telephone network (PSTN) including a plurality of switching facilities, each switching facility respectively associated with one of a plurality of local providers serving telephone stations connected to respective subscriber lines, said telephone stations having local telephone numbers assigned thereto, said switching facilities having associated therewith respective routing identification information stored in said PSTN, a method for providing local telephone number portability with a change of service provider to a remote station having an existing subscriber line path connection to a first one of said switching facilities, said method comprising the steps of:

establishing a new subscriber line path for said remote station to a second one of said switching facilities;

updating said routing identification information stored in said PSTN to reflect a change in routing of calls to the telephone number assigned to said remote station from said first switching facility to said second switching facility;

routing a call to said remote station via said second switching facility through said new subscriber line path in accordance with the change in routing identification information performed in said updating step;

in response to receipt of said call in said routing step, automatically reconnecting said remote station to said new subscriber line path and removing the connection of said remote station from said existing subscriber line path.

9. A method as recited in claim 8, wherein said first and second switching facilities are each associated with a different one of said local providers and said routing identification information comprises a location routing number (LRN) for calls directed to local telephone number portability subscriber stations, said LRN being unique to a respective switching facility.

10. A method as recited in claim 8, wherein said step of reconnecting comprises:

sensing a ringing voltage across said new subscriber line path;

disconnecting said existing subscriber line connection from said remote station; and thereafter connecting said remote station to said new subscriber line path.

11. A method as recited in claim 10, further comprising the step of providing a permanent connection between said remote station and said new subscriber line path after performing said reconnecting step.

12. A method as recited in claim 9, wherein each local provider has a local portability number (LPN) database containing records correlating each ported local telephone number in the PSTN with the LRN of its associated ported switching facility, and said step of updating comprises:

adding a record for the remote station subscriber to the LPN database of each local provider; and deleting stored routing information relating said first switching facility to said remote station subscriber line from said PSTN.

13. In a public switched telephone network (PSTN) including a plurality of switching facilities, each switching facility respectively associated with one of a plurality of local providers serving telephone stations connected to respective subscriber lines, said telephone stations having local telephone numbers assigned thereto, said switching facilities having associated therewith respective routing identification information stored in said PSTN, a method for providing local telephone number portability with a change of service provider to a remote station having an existing subscriber line path connection to a first one of said switching facilities, said method comprising the steps of:

establishing a new subscriber line path for said remote station to a second one of said switching facilities;

updating said routing identification information stored in said PSTN to reflect a change in routing of calls to the telephone number assigned to said remote station from said first switching facility to said second switching facility;

routing a call to said remote station via said second switching facility through said new subscriber line path in accordance with the change in routing identification information performed in said updating step;

determining whether said remote station is in an on-hook condition;

in response to receipt of said call in said routing step and an on-hook determination in said determining step, automatically reconnecting said remote station to said new subscriber line path and removing the connection of said remote station from said existing subscriber line.

14. A method as recited in claim 13, wherein said step of terminating comprises sensing potential across said existing subscriber line and further comprising the step of terminating said routed call in response to a sensed off-hook condition.

15. A method as recited in claim 14, further comprising the step of sensing when said off-hook condition ceases, and, in response thereto changing connection of said remote station from said existing subscriber line connection to said new subscriber line path.

16. A method as recited in claim 15, wherein said changing step comprises:

actuating a first set of switch contacts to a locked closed position in response to occurrence of a ringing voltage across said new subscriber line path;

closing a second set of switch contacts in response to cessation of said off-hook condition; and completing a relay energizing circuit through said first set and second set of closed switch contacts for controlling reconnection.

* * * * *